M. RHEINAUER.
PIPE.
APPLICATION FILED MAY 14, 1909.
948,550.
Patented Feb. 8, 1910.
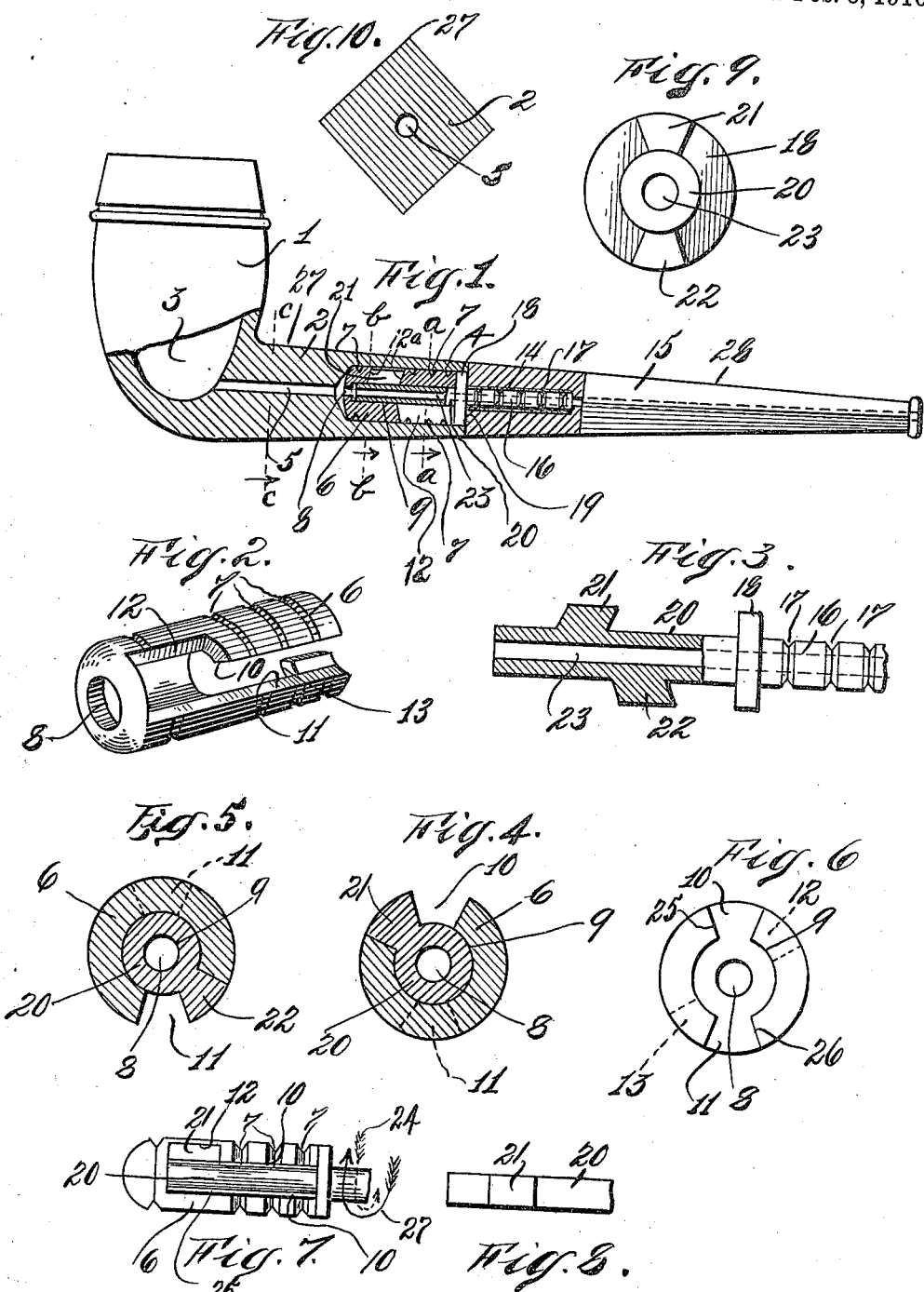
Witnesses:
C. A. Jarvis
Estelle Hamburger
Inventor:
Moritz Rheinauer
attorney

UNITED STATES PATENT OFFICE.

MORITZ RHEINAUER, OF NEW YORK, N. Y., ASSIGNOR TO DANIEL RHEINAUER, OF NEW YORK, N. Y.

PIPE.

948,550.  Specification of Letters Patent.  Patented Feb. 8, 1910.

Application filed May 14, 1909. Serial No. 495,957.

*To all whom it may concern:*

Be it known that I, MORITZ RHEINAUER, a citizen of the United States, residing at Manhattan borough, city, county, and State of New York, have invented certain new and useful Improvements in Pipes, of which the following is a clear, full, and exact description.

This invention relates to an interlocking device which is adapted to secure the stem and mouth-piece of a tobacco-pipe together.

While my improved securing device may be applied to any pipe, in which the stem and mouth-piece are separably connected, it is especially designed for meerschaum pipes, for reasons to be hereinafter explained.

I will now proceed to describe my invention, the novel features of which I will finally claim, reference being had to the accompanying drawing, forming part hereof, wherein:—

Figure 1 is a side elevation partly in section of a pipe embodying my improvement, showing the pipe and mouth-piece secured together; Fig. 2 is a perspective view on an enlarged scale of the lock portion of my improvement; Fig. 3 is an enlarged side elevation of the key portion of my improvement, partly in section; Fig. 4 is a cross-section of my improved locking mechanism taken on a line $a$—$a$ in Fig. 1; the pipe stem being omitted; Fig. 5 is a similar view taken on a line $b$—$b$ in Fig. 1; Fig. 6 is an end view of the lock portion of my improvement, looking from right in Fig. 1; Fig. 7 is a top plan detail view, showing the lock and key interlocked; Fig. 8 is a fragmentary top plan view of the key shown in a position to enter the lock; Fig. 9 is an enlarged end view, looking from the left in Fig. 6, of the key; and Fig. 10 is an enlarged cross-section taken on a line $c$—$c$ in Fig. 1.

Before describing the mechanical features of my invention I wish to call attention to the pipe itself. The pipe is an important feature of my invention, and the material from which it is made; namely, meerschaum, is especially favored by my improved interlocking or securing device. It is well known in the arts that meerschaum is formed by baking a certain clay and another element mixed therewith, and that the said meerschaum is very brittle and delicate. The usual manner of securing the pipe and mouth-piece together is by means of a threaded nib, on the mouth-piece, and a threaded opening in the stem of the pipe which is adapted to receive the said threaded nib. By the constant separation of the stem and mouth-piece the said threaded parts become loose and are easily broken, and not infrequently the stem of the pipe. Consequently I have found the majority of meerschaum pipes are in the repair shop most of the time. To properly color the meerschaum it is absolutely impossible to employ any of the base metals as a bushing for the threaded nib to engage, and consequently the opening in the meerschaum stem has to be threaded, which renders the said stem very delicate. Furthermore, if a metal bush is employed the danger of causing the stem to crack is greatly increased, owing to the expansion of the said metal bush. The stem will not color properly if a metal bush be used, as it burns the meerschaum, and in most cases produces a greenish tint near the end of the stem. It is to obviate the necessity of employing a metal bushing in the stem of the pipe that I have produced the securing device to be hereinafter described.

I have found by experience that the securing means for the stem of a meerschaum pipe and the mouth-piece therefor, should be preferably of bone or some osseous substance. A gold or silver connection could be used with some advantage over base metals, an osseous substance being preferable as it is a poor conductor of heat and will not expand.

Referring to the drawing, 1 in Fig. 1, indicates the bowl of a meerschaum pipe and 2 the stem thereof, the bowl being provided with a well 3. To provide for the lock of my improved securing device, I counterbore the stem 2 at 4, the said counterbore being in communication with the well 3 by a duct 5 for the usual purpose. Within the counterbore 4 I glue, cement or otherwise secure the lock element of my improvement, which comprises a bushing 6 made out of bone or other osseous material. The bushing 6 is provided with peripheral notches 7 which aids the glue or cement to hold the bushing 6 securely in position.

By referring to Fig. 6 it will be seen that the bushing 6 is provided with a central bore 8 which alines with the duct 5, the said bore being also in communication with a larger counterbore 9 in the bushing 6 (see Figs. 1, 4, 5 and 6).

By referring to Fig. 2 it will be seen that the bushing 6 is severed throughout the greater part of its length by angular slots 10 and 11 (see Fig. 6), which slots open into the counterbore 9. Adjacent the front of the bushing a recess 12 is formed which extends from the slot 10, the said recess having an angular end 12ª (see Fig. 1). Adjacent the rear of the bushing 6 a recess 13 is formed, which also has angular ends, the recess 13 extending from the slot 11 in a direction opposite to the direction of the recess 12 (see Fig. 6).

As a coöperating locking device I cement, or otherwise secure in the counterbore 14, of the mouth-piece 15, a key consisting preferably of bone, comprising a stem 16, provided with peripheral grooves 17 to aid the cement to hold the stem in the mouth-piece. The stem 16 is carried by a head 18 which is adapted to contact a portion of the face 19 of the mouth-piece 15 when the said shank is in position. The head 18 also carries a stem 20 upon which are mounted the locking barbs 21 and 22. The barbs 21 and 22 are adapted to enter the recesses 12 and 13 in the bushing 6 which will hereinafter appear. The stems 16 and 20 are provided with a central duct 23, which alines with the duct 8 in the front end of the bushing 6 (see Fig. 1).

It will be seen in Fig. 1 that the end of the bushing 6 is somewhat removed from the adjacent end of the pipe stem 2, in order that the head 18 can completely enter the counterbore 4 in the stem 2 and contact the end of the bushing 6.

When the stem 2 of the pipe and mouth-piece 15 are locked together the barbs 21 and 22 will lie within the recesses 12 and 13 respectively; therefore, the said parts cannot be separated by a longitudinal pull. In order to separate the parts the mouth-piece 15 will be turned in the direction of the dotted arrow 24 (Fig. 7) until the parts contact the sides 25 and 26 of the slots 10 and 11 respectively, at which time the said mouth-piece can be pulled out, for the reason that the said barbs will slide out through the said recesses 12 and 13. To connect the parts the mouth-piece 15 is turned to bring the barbs 21 and 22 in alinement with the slots 10 and 11 (see Fig. 8) in the bushing 6, and while in this position the barbs are slid into and along the slots 10 and 11 until the head 18 contacts the bushing 6, at which time the mouth-piece can be turned as per the arrow 27 (Fig. 7) to cause the said barbs to enter the recesses 12 and 13.

It is quite obvious from the above description that I am able to eliminate any screw-threading, and that an air tight connection is provided by the head 18 contacting the bushing 6. Moreover all strains are kept from the stem 3 by reason of the said head contacting the bushing 6.

Fig. 10 illustrates the configuration of the stem 2 of the pipe, namely diamond shape, the mouth-piece 15 being also diamond shaped as can be seen in Fig. 1. In order to render the pipe and stem attractive it is necessary to cause the apex 27 of the stem, and the apex 28 of the mouth-piece to aline. My improved locking device is particularly well adapted for this purpose for the reason that when the barbs 21 and 22 are seated in their respective recesses 12 and 13, the slots 10 and 11 being vertically positioned, the apex 28 will aline, and will always aline with the apex 27. To accomplish the above result, I place the bushing 6 in the stem 2 in such a manner as to cause the apex 27 and slots 10 and 11 to come into vertical alinement, while the barbs 21 and 22 are so positioned, relatively to the apex 28, as to cause the apex to aline with the apex 27 when the parts are interlocked.

Having now described my invention what I claim and desire to secure by Letters Patent is:—

1. A securing device adapted to releasably lock the stem of a meerschaum pipe and a mouthpiece therefor together, comprising a hollow bushing made of bone within said stem and removed from the end thereof, whereby a recess in said stem is provided, a key carried by said stem, a head on said key adapted to contact one end of said bushing and fill up said recess, locking devices carried by said key, and locking devices carried by said bushing adapted to interlock with the locking devices on said key.

2. A securing device adapted to releasably lock the stem of a meerschaum pipe and a mouth-piece therefor together, comprising a hollow bushing made of bone within said stem and removed from the end thereof, whereby a recess in said stem is provided, said bushing being provided with slots, said bushing being also provided with recesses in communication with said slots, a hollow key carried by said mouth-piece, barbs carried by said key adapted to pass through the slots in said bushing and to enter the recesses extending therefrom.

3. A securing device adapted to releasably lock the stem of a meerschaum pipe and a mouthpiece therefor together, comprising a hollow bushing within said stem, said bushing being bifurcated throughout a portion of its length, said bushing being also provided with recesses in communication with said bifurcation, a hollow key carried by said mouth-piece, and barbs carried by said key, adapted to pass through the bifurcation in said bushing and to enter the recesses extending therefrom.

Signed at New York city, N. Y., this 12 day of May 1909.

MORITZ RHEINAUER.

Witnesses:
 ALFRED E. SELIGER,
 EDWARD A. JARVIS.